United States Patent [19]

Masek et al.

[11] 3,877,494

[45] Apr. 15, 1975

[54] APPARATUS FOR DEFINING A VARIABLE CONDUCTIVE PATTERN SUITABLE FOR THREADING THROUGH THE ELEMENTS OF A DIGITAL MEMORY

[75] Inventors: Milos Masek; Josef Mohelnicky, both of Prague, Czechoslovakia

[73] Assignee: Vyzkumny ustav matematickych stroju, Prague, Czechoslovakia

[22] Filed: Apr. 10, 1972

[21] Appl. No.: 242,818

[30] Foreign Application Priority Data

Apr. 13, 1971 Czechoslovakia .................. 2611-71

[52] U.S. Cl. ................................ 140/71 R; 156/436

[51] Int. Cl. ............................................ B21f 45/00

[58] Field of Search .................. 29/604, 625, 630 A; 140/71 R; 156/176, 177, 178, 436, 439, 440; 161/DIG. 7

[56] References Cited

UNITED STATES PATENTS

| | | | |
|---|---|---|---|
| 2,076,343 | 4/1937 | Humphner | 156/440 |
| 2,772,718 | 12/1956 | Magnuson | 156/439 |
| 3,053,717 | 9/1962 | Bright | 156/440 |
| 3,511,739 | 5/1970 | Hebberling | 156/177 |
| 3,523,844 | 8/1970 | Crimmins et al. | 156/436 |
| 3,616,001 | 10/1971 | Addis | 156/177 |
| 3,616,066 | 10/1971 | Rainy | 156/436 |

*Primary Examiner*—C. W. Lanham
*Assistant Examiner*—E. M. Combs

[57] ABSTRACT

An automated technique for defining one of a plurality of dual wire patterns to be threaded through the elements of a digital memory is described. A pair of continuous wires are respectively passed through to the longitudinal axis of a flexible planar substrate and are adherently placed on the substrate. The guides are simultaneously but independently movable transversely about the longitudinal axis to define any of a plurality of selectable patterns of displacement about such axis: e.g., a pair of parallel positions of opposite senses, and a pair of oblique positions of opposite senses. The substrate is advanced longitudinally after each transverse movement of the guides to define a corresponding portion of the pattern. A second flexible elongated tape may be introduced over the exposed surface of the wire pattern on the substrate to form an insulating sandwich.

7 Claims, 4 Drawing Figures

APPARATUS FOR DEFINING A VARIABLE CONDUCTIVE PATTERN SUITABLE FOR THREADING THROUGH THE ELEMENTS OF A DIGITAL MEMORY

BACKGROUND OF THE INVENTION

In the past, difficulties have been encountered in the manufacture of insulated interleaved wire patterns. The wires defining such patterns are suitable, e.g. as the binary 1 and binary 0 command leads to be threaded, e.g. through the ferrite cores of a memory matrix. Such manufacture is conventionally done manually and involves the laying out, bundling, and placement of the wires in a pattern on a planar substrate. In such cases the accuracy of the pattern is, of course, susceptible to human error, particularly where unskilled or inattentive workers are involved. Moreover, even when employing a partially automated fabrication involving the use of photoetching techniques to define printed wire patterns, such patterns cannot generally accommodate core memories of significant word length, since in general the word length is proportional to the length of the pattern and the pattern length obtainable from printed wiring is limited.

SUMMARY OF THE INVENTION

A completely automatic technique for defining one of a plurality of predetermined wire patterns suitable for threading through the elements of a digital memory is provided by the present invention. A pair of continuous wires that are to define the pattern are passed through a pair of wire guides and into adherent contact with an elongated planar substrate. The wire guides are independently supported for reciprocal movement perpendicular to a longitudinal axis of the substrate. The wire guides are each movable into a plurality of positions with respect to the longitudinal axis and, in one embodiment, the wire guides are intermittently moved symmetrically through like displacements in opposite directions in response to commands from a programmer to define one routing arrangement for the memory. After each displacement, the substrate is longitudinally advanced to define on the substrate an adherent portion of the wire pattern corresponding to the last displacement of the wire guides. The number of such intermittent advances of the substrate corresponds in general to the number of bits in a word to be stored in the memory.

In one arrangement, four discrete displacement positions of the wire guides are employed. Two positions correspond to parallel orientations of the wires in respectively opposite senses, and the other two positions correspond to selected oblique orientations of the wires in respectively opposite senses.

An insulating planar sandwich may be manufactured by covering the exposed surface of the defined pattern on the substrate with a second adherent, flexible elongated tape that is urged against and advanced longitudinally with the substrate.

BRIEF DESCRIPTION OF THE DRAWING

The invention will be further set forth in the following detailed description taken in conjunction with the appended drawing, in which.

DETAILED DESCRIPTION

Figure 1:
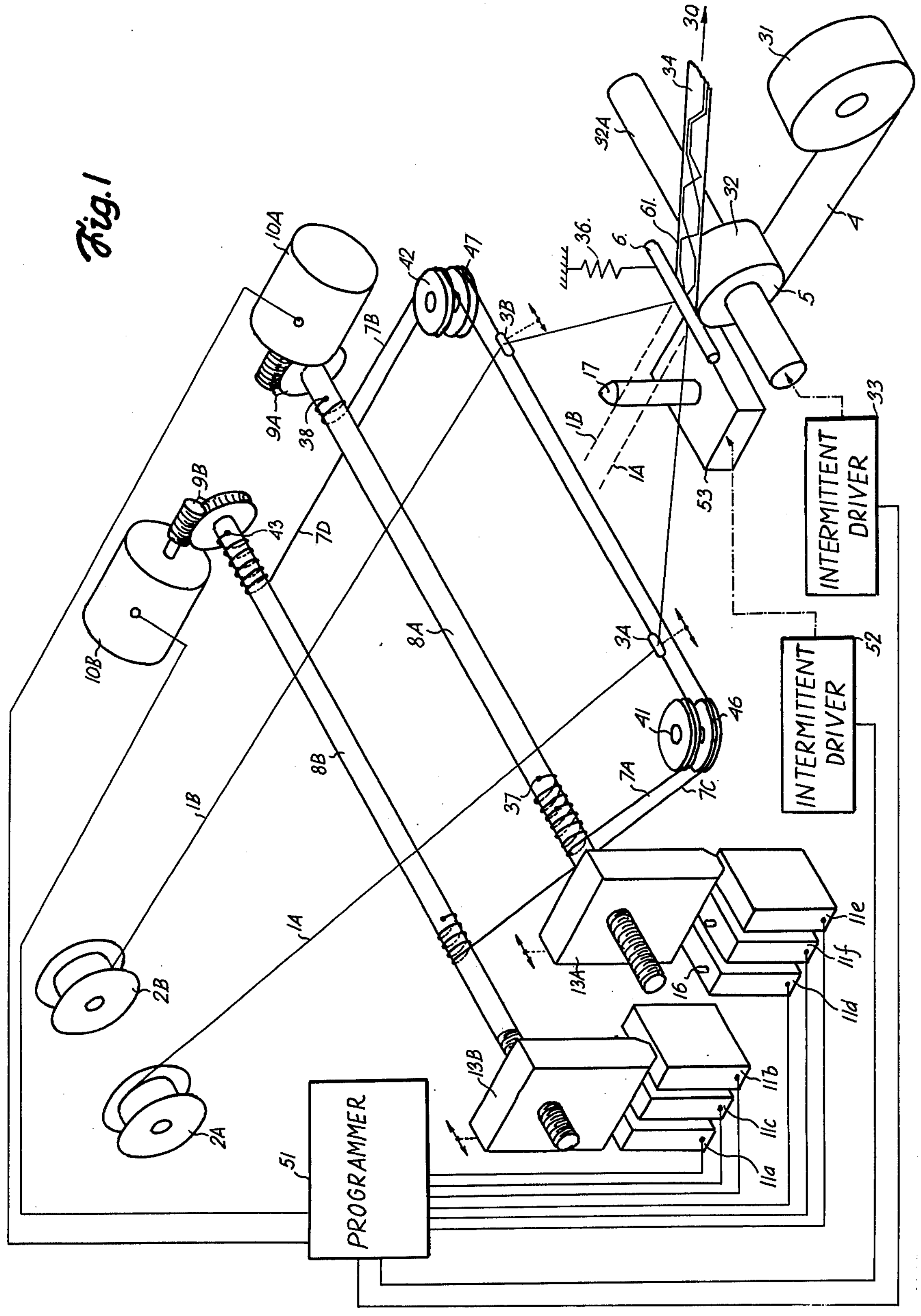
FIG. 1 is a pictorial diagram of an illustrative apparatus constructed in accordance with the invention for defining a dual interleaved wire pattern on a flexible substrate.

Referring now in more detail to FIG. 1, a pair of bobbins 2A and 2B are mounted on shafts (not shown) extending perpendicular to a longitudinal axis which is oriented in the direction of an arrow 30. Supply wires 1A and 1B, which are to define an interleaved pattern as described below, are initially wound on the bobbins 2A, 2B.

A flexible elongated planar insulating substrate 4 is routed from a suitable supply reel 31 around the circumference of a cylinder 5 and then extends in a longitudinal direction as shown. The cylinder 5 has a resilient peripheral surface 32 and is mounted on a shaft 32A extending perpendicular to the longitudinal axis 30. The shaft 32A is driven by an intermittent driver 33 which may be a conventional pawl or cam driven mechanism.

The supply wires 1A and 1B are individually routed from the bobbins 2A and 2B through a pair of movable wire guides 3A and 3B and into contact with a surface 34 of the substrate 4. A bearing member 6 urges the wire-carrying substrate 4 against the resilient surface 32 of the cylinder 5. Consequently, each increment of motion of the intermittent driver 33 causes the substrate 4 to be longitudinally advanced through a predetermined increment related to the pitch of an interleaved pattern of the wires 1A and 1B on the substrate as described below.

The wires 1A and 2A are made to adhere to the surface 34, e.g., by providing a suitable adhesive on the surface 34, by making the surface 34 out of a naturally adherent material, or by making the surface 34 and/or insulation on the wires 1A and 1B of thermoplastic material and subjecting the contacting surfaces of the wires and substrate to suitable heat.

The wire guides 3A and 3B are individually supported for reciprocation in a direction perpendicular to the longitudinal axis 30. For this purpose, the guide 3A is carried by a first drive rod 8A through a first pair of supporting wires 7A and 7B. The guide 3B is carried by a second drive rod 8B through a second pair of supporting wires 7C and 7D. The lengths of the wires 7A–7D are chosen to maintain the guides 3A and 3B in symmetrical relation relative to the longitudinal axis 30.

A free end 37 of the support wire 7A is wound in a first sense around one end of the drive rod 8A, and a free end 38 of the support wire 7B is wound in the opposite sense around the other end of the rod 8A. In this manner, rotation of the rod 8A in one direction causes the end 37 to wind and the end 38 to unwind, thereby driving the guide 3A in a first transverse direction between a pair of intermediate supports 41 and 42. Rotation of the rod 8A in the opposite direction causes the end 38 to wind and the end 37 to unwind, thereby driving the guide 3A in the opposite transverse direction between the supports 41 and 42.

In like manner, a free end 43 of the support wire 7D is wound in a first sense about one end of the drive rod 8B, and a free end (not shown) of the wire 7C is wound in the opposite sense about the other end of the rod 8B. By analogy to the above discussion, with this arrangement the rotation of the drive rod 8B in opposite directions moves the guide 3B in respectively opposite transverse directions between a pair of intermediate supports 46 and 47. The senses of winding of the ends of the support wires 7A–7D around the respective drive rods 8A and 8B, and/or the senses of relative rotations of the rods 8A and 8B, are chosen so that the wire guides 3A and 3B are movable simultaneously in mutually opposite directions with respect to the longitudinal axis 30.

The drive rods 8A and 8B are individually coupled through worm and wheel pairs 9A and 9B to drive motors 10A and 10B. These motors are simultaneously enabled in response to suitable commands from a programmer 51.

The motor 10B, once enabled, may be subsequently disabled by the actuation of any one of a plurality of microswitches 11*a*, 11*c*, and 11*b* adjacent an extension of the drive rod 8B. The microswitches 11*a*, 11*c*, and 11*b* are successively actuable by a threaded contact arm or other member 13B. The contact arm 13B is carried on a threaded end of the drive rod extension for translational movement along the rod 8B as such rod is rotated. Thus, in the position shown in FIG. 1 with the wire guide 3B at a maximum displacement in one sense from the longitudinal axis 30, the contact arm 13B depresses the microswitch 11*a*. When the wire guide 3B is moved to a position closer and parallel to the axis 30 as shown in the dotted lines in FIG. 1, the contact arm 13B will have traversed to the right to depress the center microswitch 11*c*. When the guide 3B is further moved to the opposite maximum displacement position from the longitudinal axis 3B, the contact member 13B simultaneously reaches a position to depress the microswitch 11*b*.

The drive motor 10A is enabled and disabled in like manner by means of a corresponding associated contact arm 13A and corresponding associated microswitches 11*d*, 11*f*, and 11*e*. It will be noted from FIGS. 1 and 2 that the contact arms 13A and 13B are oppositely directed and positioned with respect to the associated microswitches 11*a*–11*c* and 11*d*–11*f*. Therefore, when the contact arm 13B depresses the microswitches 11*a* or 11*b*, the contact arm 13A depresses the microswitch 11*e* or 11*d*, respectively. In like manner, when the contact arm 13B depresses the center microswitch 11*c*, the contact arm 13A depresses the microswitch 11*c*.

Figure 2A:
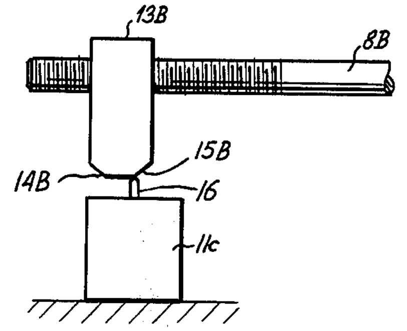
FIGS. 2A and 2B are pictorial diagrams of complementary contact members carried by a portion of the apparatus of FIG. 1 for actuating microswitches to disable such apparatus.
Figure 2B:
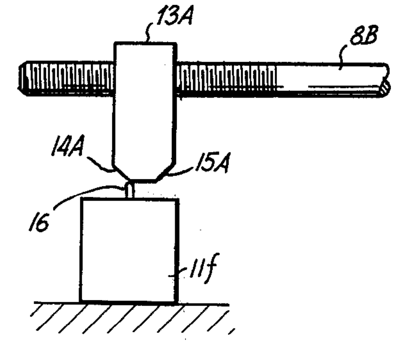

As shown in FIG. 2A, the contact arm 13B is provided with longitudinally opposite beveled edges 14B and 15B which individually depress pushbutton 16 of the center microswitch 11*c* as the arm 13B traverses the threaded end of the rod 8B in respectively opposite directions. Likewise, as shown in FIG. 2B, the contact arm 13A is provided with opposite beveled edges 14A and 15A which individually depress pushbutton 16 of the microswitch 11*f* as the arm 13A traverses the end of rod 8A in respectively opposite directions.

Each of the microswitches 11*a*–11*f* is coupled to the programmer 51 to initiate the disabling of the motors 10A and 10B. Such disabling serves to bring the wire guides 3A and 3B to rest at predetermined symmetrical orientations with respect to the longitudinal axis 30.

The programmer 51 may typically respond to each detected actuation of a microswitch to enable the intermittent driver 33 associated with the substrate-moving cylinder 5, and further may typically respond to each actuation of the center microswitches 11*c* and 11*f* to enable a second intermittent driver 52. The driver 52, when enabled, serves to selectively raise a mandrel 17 which is supported for movement in a housing 53. The lowered position of the mandrel corresponds to a location below the plane of the parallel-oriented wires 1A and 1B in FIG. 1. The mandrel is operated by the driver 52 to extend upwardly between the wires in their parallel orientation as indicated by the dotted lines.

As indicated above, the microswitches 11*c* and 11*f* are actuated each time the wires 1A and 1B assume a parallel orientation, either in the sense illustrated by the dotted lines or in the opposite sense. In order to maintain the wires at a minimum parallel spacing corresponding to the orientation of the associated portion of the interleaved pattern to be described below, the diameter of the mandrel 17 is chosen to be equal to the desired minimum spacing between the wires in their parallel position.

The operation of the arrangement of FIG. 1 will now be described in connection with the manufacture of an adherent, interleaved wire pattern (designated generally at 61) on the surface 34 of the substrate 4. It will be assumed that the apparatus is initially at rest, with the wires 1A and 1B in their parallel position shown in the dotted lines and with the front ends of the wires 1A and 1B in adherent contact with the surface 34 between the bearing member 6 and the resilient circumference of the cylinder 5.

Upon the outpulsing of a first command from the programmer 51, the motors 10A and 10B are enabled to rotate the associated guide rods 8A and 8B so that the wire guides 3A and 3B traverse in respectively opposite directions with respect to the axis 30 to the extreme displacement positions shown in solid lines in FIG. 1. When the wire guides 3A and 3B reach this position, the associated contact arms 13A and 13B will individually depress the microswitches 11*c* and 11*a*, which causes the programmer 51 to issue commands disabling the motors 10A and 10B and enabling the intermittent driver 33.

The substrate 4 is thereupon advanced to define a first crossed portion of the pattern 61 corresponding to the depicted oblique orientation of the wires 1A and 1B.

After the substrate 4 has thus advanced, the programmer 51 sends a second enabling command to the drive motors 10A and 10B, which now operate to move the wire guides 3A and 3B in mutually opposite directions back toward the longitudinal axis 30. When the guides have moved sufficiently so that the wires 1A and 1B are in a parallel orientation in a sense opposite to that depicted in dotted lines in FIG. 1, the contact arms 13A and 13B will depress the center microswitches 11*f* and 11*c*.

The actuation of the microswitches 11*f* and 11*c* causes the programmer 51 to disable the motors 10A and 10B and to enable both of the intermittent drivers 33 and 52.

The enabling of the driver 52 momentarily moves the mandrel 17 to its upper position shown to maintain the wires 1A and 1B at their minimum parallel spacing. The enabling of the driver 33 again longitudinally advances the substrate 4 to define a first parallel portion of the pattern 61 corresponding to the now-parallel orientation of the wires 1A and 1B.

When the latter advance of the substrate is completed and the mandrel returns to its lower position, the programmer 51 outpulses another command to the motors 10A and 10B. The drive rods 8A and 8B are now rotated to move the wire guides 3A and 3B to their maximum displacement positions opposite to that shown in FIG. 1, whereupon the contact arm 13A depresses the microswitch 11*d* and the contact arm 13B depresses the microswitch 11*b*.

The actuation of the microswitches 11*d* and 11*b* causes the programmer 51 to disable the motors 10A and 10B and to enable the intermittent driver 33. The latter longitudinally advances the substrate 4 again to define on the surface 34 a second crossed portion of the pattern 61 corresponding to the now-oblique orientation of the wires 1A and 1B.

The programmer 51 then enables the motors 10A and 10B again to move the wire guides from their just described maximum displacement positions back toward the longitudinal axis 30 and into the parallel orientation depicted in dotted lines in FIG. 1. The contact arm 13A and 13B thereupon depress the center microswitches 11*f* and 11*c*, respectively to cause the programmer 51 to disable the motors 10A and 10B and enable both intermittent drivers 52 and 33. The enabling of the driver 52 again raises the mandrel 17 to its operative position, and the enabling of the driver 33 longitudinally advances the substrate 4 to define a second parallel portion of the pattern 61 corresponding to the now-parallel orientation of the wires 1A and 1B to complete a full pattern cycle.

An arbitrary number of additional cycles of the patterns can in like manner be formed automatically and consecutively on the substrate 4 by repetitively executing the above-described program. Consequently, a pattern of arbitrary length corresponding, e.g., to a stored digital word of any desired number of bit positions, can be quickly and easily fabricated.

Figure 3:
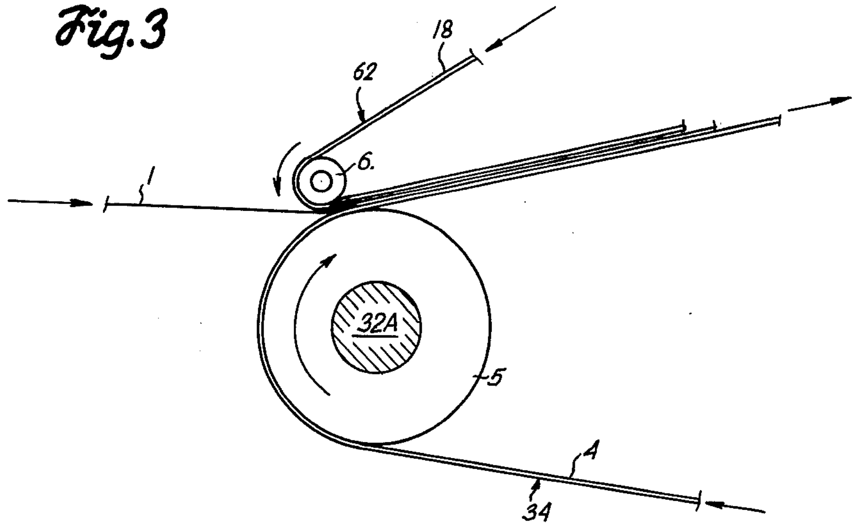
FIG. 3 is a pictorial diagram of an arrangement suitable for use in the apparatus of FIG. 1 for uniting the wire pattern, the substrate, and an overlying flexible adherent tape into an insulating sandwich.

FIG. 3 shows an addition to the arrangement of FIGS. 1 and 2 wherein a second flexible elongated tape 18 may be routed around the bearing member 6 and into contact with the exposed upper surface of the interleaved wire pattern on the substrate 4. In this way the tape 18, having a surface 62 which may be made adherent in any desired menner to the wire pattern and to the substrate 4, is longitudinally advanced in synchronism with the substrate 4 and urged into firm adherent contact with the wire pattern and with the substrate 4 to define a sandwiched wire pattern.

In the foregoing, the invention has been described in connection with preferred arrangements thereof. Many modifications and variations will now occur to those skilled in the art. For example, any other desired program can be commanded by the programmer 51 to define arbitrary dual wire pattern shapes on the substrate 4 by the use of standard stored-program on hard-wired techniques. Accordingly, it is desired that the scope of the appended claims not be limited to the specific disclosure herein contained.

We claim:

1. For use in the manufacture of a digital memory, apparatus responsive to a sequence of selected commands for producing, from first and second wires, a predetermined plurality of wire patterns mounted on a substrate, which patterns are representative of conductive paths through the elements of the digital memory, said apparatus comprising:

means supporting the substrate for movement along a longitudinal axis;

first and second wire guides individually supported for reciprocal movement along parallel first and second paths each perpendicular to the longitudinal axis;

means for individually threading the first and second wires through the first and second wire guides and into adherent contact with a surface of the substrate;

first means responsive to a selected one of the command for moving the first wire guide along the first path into one of the plurality of predetermined positions;

second means responsive to said selected command for independently moving the second wire guide along the second path into one of a plurality of similar predetermined positions;

first and second means individually operative when the first and second wire guides reach their respectively selected positions for disabling the associated moving means; and means rendered effective at the conclusion of each operation of the first and second disabling means for longitudinally advancing the substrate by a predetermined increment to define separate portions of the pattern on the substrate.

2. Apparatus as defined in claim 1, in which the substrate is of flexible material and in which the supporting means comprises, in combination, a cylinder mounted for rotation about an axis parallel to the first path; a bearing member disposed adjacent the periphery of the cylinder; means for passing the patterned substrate between the bearing member and the periphery of the cylinder with the exposed face of the pattern facing the bearing member; and resilient means for urging the bearing member into engagement with the substrate.

3. Apparatus as defined in claim 2, further comprising an elongated adherent tape, and means for passing the tape longitudinally over the patterned substrate between the resilient means and the periphery of the cylinder so that the tape, the wire pattern and the substrate define an adherent sandwich.

4. Apparatus as defined in claim 1, in which the moving means comprises, in combination, a pair of drive rods individually associated with each wire guide, and a pair of flexible strands associated with each drive rod, one end of each strand in each pair being attached to a separate end of the associated wire guide, the other end of one strand in each pair being wound on a first sense around one end of the associated drive rod, the other end of the remaining strand in each pair being wound in the opposite sense around the other end of the associated drive rod.

5. Apparatus as defined in claim 4, in which the first disabling means comprises, in combination, first and second microswitches associated with each drive rod, and a contact arm carried by each drive rod for transversal movement along the rod in response to a rotation of the rod for individually actuating the first and second microswitches when the associated wire guide exhibits the first orientation in respectively opposite senses.

6. Apparatus as defined in claim 5, in which the second disabling means comprises, in combination, a third microswitch associated with each drive rod, each contact arm actuating the associated third microswitch when the associated wire guide exhibits the second orientation.

7. Apparatus as defined in claim 1, further comprising a mandrel disposed longitudinally between the wire guides and the supporting means and mounted for selective movement between a first position spaced from the wires and a second position extending perpendicularly between the wires to establish a minimum parallel separation of the wires.

* * * * *